United States Patent [19]

Leshner

[11] 3,968,689

[45] July 13, 1976

[54] MOUNTING THERMOCOUPLES IN INTERNAL COMBUSTION ENGINES

[75] Inventor: Ervin Leshner, Cherry Hill, N.J.

[73] Assignee: Fuel Injection Development Corporation, N.J.

[22] Filed: June 30, 1975

[21] Appl. No.: 591,608

[52] U.S. Cl. ............................. 73/341; 73/346; 73/349; 136/230
[51] Int. Cl.² ................. G01K 1/14; G01K 7/04; G01K 13/02
[58] Field of Search ................ 73/341, 346, 349; 136/230

[56] References Cited
UNITED STATES PATENTS

| | | | |
|---|---|---|---|
| 903,090 | 11/1908 | Hopkins | 73/341 X |
| 1,653,213 | 12/1927 | Kates | 73/346 |
| 1,902,932 | 3/1933 | Zubaty | 73/346 UX |
| 2,445,156 | 7/1948 | Smith | 73/341 |
| 3,101,617 | 8/1963 | Brinson | 73/341 |
| 3,472,068 | 10/1969 | List | 73/346 X |
| 3,873,102 | 3/1975 | Lotze | 73/349 XR |

*Primary Examiner*—Richard C. Queisser
*Assistant Examiner*—Frederick Shoon
*Attorney, Agent, or Firm*—Woodcock Washburn Kurtz & Mackiewicz

[57] ABSTRACT

A gasket structure for supporting thermocouple junctions in a stream of gas passing through an internal combustion engine. The thermocouple leads are passed edgewise through a gasket, which is adapted to fit between the ports of an engine and the manifold associated therewith. The leads are firmly supported within the gasket, the junction formed by the ends thereof protruding into the gasket aperture. The thermocouple junction is thus disposed in the gas stream at a regular, predetermined distance from the combustion chamber of the engine.

In one embodiment a plurality of thermocouples are embedded in an exhaust manifold gasket, each being associated with a separate exhaust port of an engine. A selector switch may be used to monitor the status of the gas flow through each port; or the thermocouples may be connected together so that an averaged signal is produced, and the signal utilized to monitor the fuel-air mixture ratio.

13 Claims, 5 Drawing Figures

MOUNTING THERMOCOUPLES IN INTERNAL COMBUSTION ENGINES

BACKGROUND OF THE INVENTION

The present invention relates to internal combustion engines, and more particularly to improved means for supporting a thermocouple junction in the stream of a gas flowing through an engine.

Since its inception, both the maintenance and development of the internal combustion engine have required analytical apparatus. Over the years, varied and sophisticated means have been developed for monitoring the operation of these engines. Trucks, automobiles and airplanes are commonly furnished with instrumentation for monitoring engine vacuum, temperature, and oil pressure and repair shops are often provided with facilities for testing engine compression, electrical characteristics, and exhaust gas composition.

One aspect of internal combustion engine operation which has to date been little used for monitoring automotive engine operation is the exhaust gas temperature. Although it is known to monitor temperature of the exhaust gases of aircraft by means of thermometers, thermocouples or related devices, for automobiles this approach has been substantially restricted to laboratory or controlled field tests.

The principal drawback to the monitoring of exhaust temperature is an economic one and involves the mounting of the thermal sensing unit. Aircraft engines tend to be relatively expensive mechanisms, and the incremental cost of the thermal sensors is not generally considered to be significant. Further, the construction of aircraft engines lends itself well to the implementation of thermal sensing mountings in that exhaust manifolds are commonly fabricated from tubular material and thus have relatively uniform dimensional characteristics. It is a relatively simple task to drill a hole in such a manifold, insert a probe through the hole, and attach the probe to the manifold by means of a clamping strap arrangement. Most automobiles and trucks, however, utilize cast iron manifolds. In view of the irregular configurations of such manifolds, simple clamping arrangements have been found unsatisfactory. In order to mount the thermal sensors in the exhaust streams of automobiles, an almost universal procedure is to drill and tap the manifolds to receive a threaded mounting gland. Such drilling and tapping operations are relatively expensive and are not easily accomplished in the garages and small repair shops which perform most of the maintenance and repair work upon privately-owned vehicles.

A still further problem in inserting probes through cast manifold walls is that, due to the irregular configuration of the manifolds, it is often impossible to place the probes at identical distances from each cylinder port. Due to the rapid change in the temperature of the exhaust streams, it is necessary that the thermal probes be placed in identical positions in order to obtain meaningful readings.

In one popular but strictly analytical approach thermocouple mountings are formed in combination with the spark plugs of an engine. While such devices may lend themselves to analytical work under controlled conditions the scope of their use is relatively limited. The devices are expensive, and moreover are typically exposed to the high voltages which are applied to the spark plug. Further, they serve to sense the temperature at only a single point in the combustion chamber. It is generally known that temperatures vary greatly within the combustion chambers of internal combustion engines, so that the temperature encountered at one point therein may not be representative of the overall combustion process.

With the advent of the stratified charge engine and the increasing need for pollution-free power plants, the need for monitoring engine combustion has increased. Further, it has been found that state-of-the-art exhaust gas analyzers are not adaptable for use with stratified charge engines. Accordingly, an increased need has arisen for superior engine monitoring means which can be installed in motor vehicles quickly and inexpensively.

It is therefore an object of the present invention to provide an improved thermal sensing means for an internal combustion engine.

Another object of the invention is to provide simplified means for mounting a thermocouple in a stream of gas flowing through an engine.

It is another object of the invention to provide a thermocouple mounting structure which produces a more uniform reading than those heretofore known.

Yet another object of the invention is to provide an associated thermocouple and mounting means which may be installed in a motor vehicle easily, without modification thereto.

SUMMARY OF THE INVENTION

Briefly stated, in accordance with one aspect of the invention the foregoing objects are achieved by providing a relatively thick gasket for disposition between a manifold, and the confronting engine surfaces which define the ports thereof. A thermocouple junction is formed by joining the ends of pairs of wires of suitable metals, and the ends of the wires are passed edgewise through the gasket so that the junction extends within the gasket aperture which registers with the engine port. In a slightly different embodiment, a resilient gasket material is utilized and the thermocouple leads pressed into the surface of the gasket.

A plurality of thermocouples, one for each port, may be thus associated with the gaskets of an internal combustion engine and the leads thereof brought out to suitable utilization circuitry for analyzing or controlling operation of the engine.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
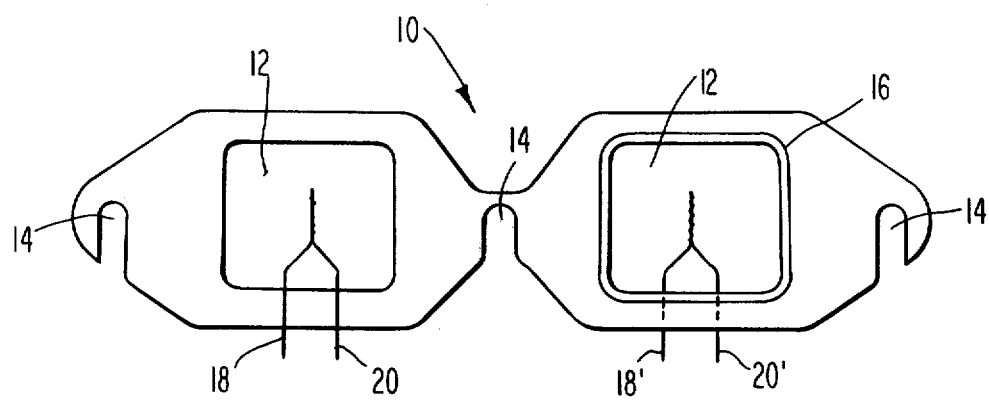
FIG. 1 illustrates the construction of a gasket formed in accordance with the invention.

FIG. 1 shows a gasket 10 of the type used between the manifold and intake or exhaust ports of a typical internal combustion engine. The gasket is provided with one or more apertures generally indicated at 12. In addition, openings 14 are provided and register with studs or locating dowels so that apertures 12 can be held in registration with the corresponding engine ports and manifold openings. In a presently preferred embodiment openings 14 comprise open-ended slots so that the gasket may be slipped laterally over the studs or dowels. This avoids the necessity of completely removing the manifolds since the gasket assembly can simply be inserted between the port surfaces and a loosened manifold.

While one popular type of gasket now in use comprises a thin sheet of metal having raised or embossed areas about the apertures where sealing is to be effected, it is contemplated that the type of gasket used with the present invention will be of the composition type. The latter type of gasket is substantially thicker than the sheet metal variety and is advantageously formed of a resilient material.

Gaskets for use with intake manifolds are typically of a pliable but non-porous composition which will not allow air or impurities to be drawn therethrough by the lowered pressure within the intake manifolding system. Composition-type exhaust manifold gaskets are generally formed from an asbestos compound or the like in order to achieve the necessary heat-resistant qualities. The edges of the apertures in such exhaust gaskets are often provided with a metal flange 16 to prevent the exhaust gases from coming into direct contact with the edge of the gasket. In still other applications, primarily in aircraft engines, manifold gaskets may be formed from a soft metal such as copper.

A thermocouple is formed by means of a pair of wires 18, 20 which are of different metals. A broad range of suitable materials can be used, the particular metals selected forming no portion of the present invention. Thermocouples of various types and intended for different applications are widely available, it being noted that for use in an internal combustion engine exhaust system the thermocouple selected should be formed of materials capable of withstanding high temperatures.

The leads 18, 20 are joined at the ends by a suitable process, such as twisting together or welding. The thermocouple leads are then brought transversely across the gasket as shown, whereupon the extending ends may be coupled to appropriate circuitry. In the embodiment of FIG. 1, leads 18 and 20 are impressed into the surface of gasket 10. If desired, and particularly where the gasket material is not highly resilient, a pair of grooves may be preformed in the gasket surface to receive the leads. If necessary, a small amount of cement may be applied to the leads to insure that they will remain within the depressions.

Figure 2:
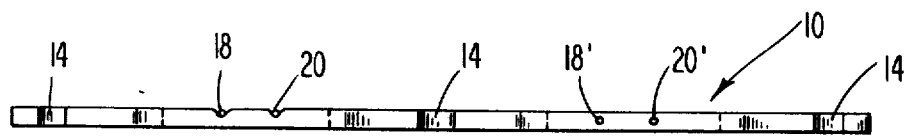
FIG. 2 is an edge view of the gasket of FIG. 1.

FIG. 2 further illustrates the disposition of leads 18, 20 in the surface of gasket 10. It is important that the leads not protrude above the surface of the gasket when in use, since this will prevent a seal between the surfaces about the port and the adjacent manifold. With a resilient gasket material, the pressure exerted by the opposed manifolds and port-surrounding surfaces should be adequate to force the leads into the gasket material to assure a good seal without damaging the leads.

It will be seen from FIGS. 1 and 2 that leads 18' and 20' are passed edgewise through gasket 10, the junction therebetween being disposed approximately in the middle of the gasket aperture 12. With soft gasket material it may be practical to simply force the leads through the material in edgewise fashion although with firm gasket materials, and particularly where metal flange 16 is present, it is desirable that openings be preformed in the gasket for receiving the leads. In the latter case it is anticipated that the compression of the gasket between the manifold and the port-surrounding surfaces will adequately seal the leads within the body of the gasket, although in some instances it may be necessary to apply a sealing compound to the leads passing through the gasket. In solid copper gaskets such as are used in aircraft engines, it is anticipated that the use of preformed openings such as those for leads 18' and 20' will comprise the most practical construction.

Figure 3:
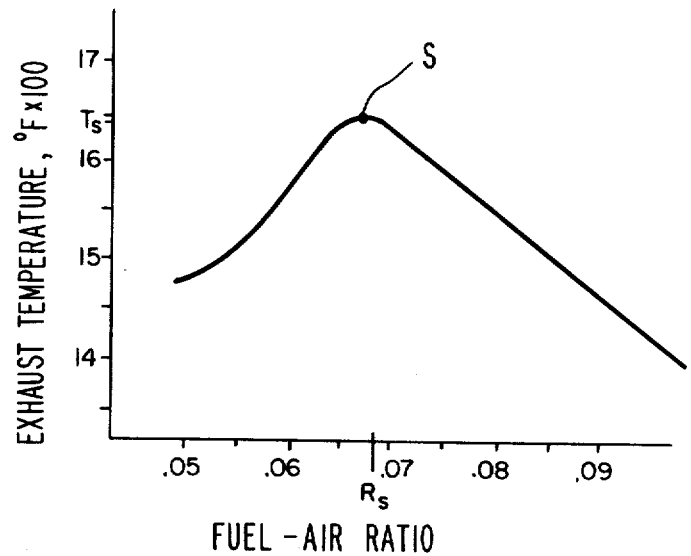
FIG. 3 is a graph illustrating certain aspects of the operation of an internal combustion engine.

Turning now to FIG. 3, the relationship between the fuel-air ratio of an internal combustion engine and the temperature of the exhaust gases thereof is depicted. The fuel-air ratio at the stoichiometric point S is denominated $R_s$. Although the curve is double-valued for temperatures below $T_s$, the temperature of the stoichiometric point S, in the past this has presented little problem since most internal combustion engines operate with a fuel-air ratio less than $R_s$. State of the art exhaust gas analyzers operate by detecting the degree to which passing exhaust gases cool, and therefore modify, the resistivity of a heated wire coupled in a Wheatstone bridge circuit. The cooling effect changes with the composition of the exhaust gas and particularly with respect to the carbon monoxide, carbon dioxide and water content thereof and is strongly a function of the molecular weight of the exhaust gas.

Due to both the double-valued temperature vs. fuel-air curve and to the increasingly non-linear response of exhaust gas analyzers for fuel-air ratios of less than $R_s$, such analyzers are not well adapted for use with stratified charge and other lean-running internal combustion engines. The use of such engines has become highly desirable in view of their relatively pollution-free exhaust characteristics; however, the fuel-air adjustment of these engines is much more critical than of prior art engines, and it is necessary that they be accurately calibrated to optimize their low pollution characteristics. In particular, too high a fuel-air ratio provides emissions which are similar to the undesirable emissions of prior art engines. The present invention, however, provides for the facile, economical disposition of temperature sensing elements at points which are located in a uniform distance from each combustion chamber and thus affords trustworthy, uniform measurements of the combustion characteristics.

Figure 4:
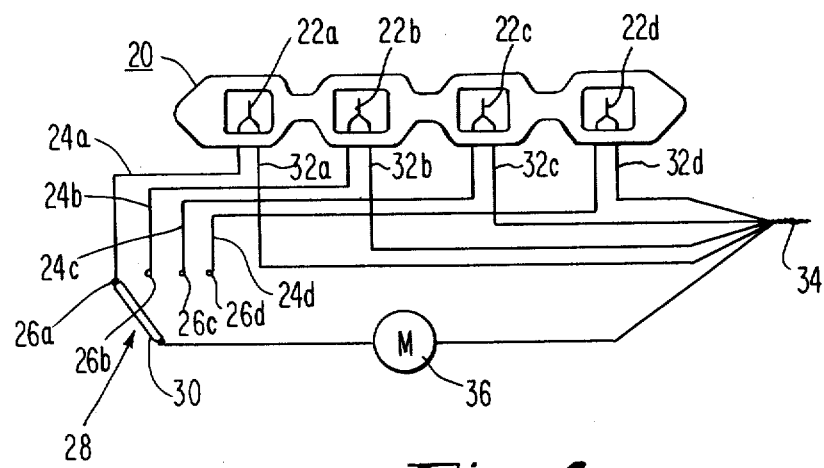
FIG. 4 is a schematic diagram showing one circuit arrangement for utilizing the present invention.
Figure 5:
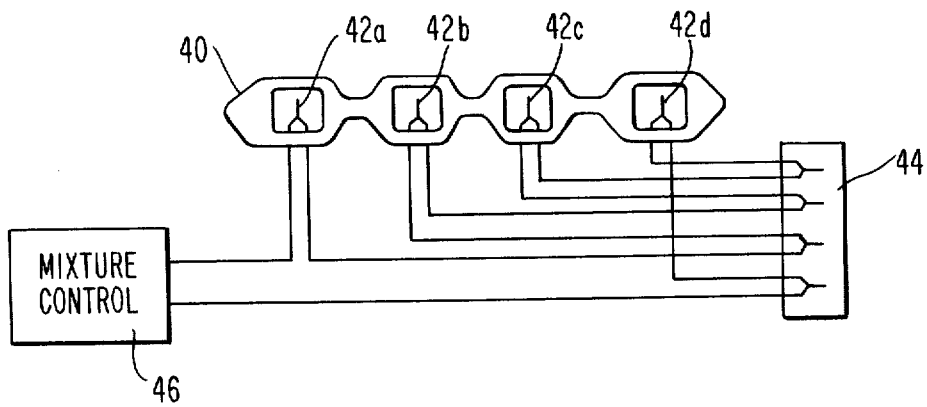
FIG. 5 is another schematic diagram showing an alternative circuit arrangement.

Turning now to FIG. 4, there is shown a series of thermocouples 22a–22d such as might be used in a four-cylinder internal combustion engine. Leads 24a–24d, which comprise corresponding leads from ones of thermocouple junctions, are brought out through gasket 20 to terminals 26a–26d of a switch generally indicated at 28. The switch includes a wiper arm 30 which may be manually positioned to contact the terminal of any given cylinder. The other leads 32a–32d of the thermocouple junctions are brought out to a common, "cold" junction 34. As is known by those skilled in the art, the temperature differential between a measuring or "hot" junction and a reference or cold junction gives rise to an electromotive force in the thermocouple circuit, which is used as an indication of the temperature of the hot junction. In one successfully-tested embodiment, the cold junction 34 was placed in thermal communication with the radiator of an automobile with whose engine the hot junctions were associated. It was found that the automobile radiator formed an admirable situs for the cold junction, as engine coolant temperature is relatively stable throughout the normal range of vehicle usage and ambient temperature conditions.

A meter 36, which may be a millivoltmeter, is coupled in circuit between switch 28 and the cold junction 34. In this manner, meter 36 can be used to obtain an indication of the fuel-air ratio of any of the cylinders of the engine. The specific system instrumentation may be varied to suit individual applications and it is anticipated that, for instance, an integrated circuit amplifier may be placed in the circuit for driving a digital or other display device.

It will be appreciated that rather than obtaining a cylinder-by-cylinder indication of the fuel-air ratio, it may be advantageous to utilize an averaged value for the entire engine. In such a case, it may be desirable to connect the thermocouple junctions together in a parallel or a series (thermopile) connection. The series or thermopile connection is ordinarily to be desired, as the electromotive forces of the individual thermocouple junction are thus additively combined to give a stronger signal.

FIG. 4 illustrates such an averaging arrangement. Hot junctions 42a–42d extend into the port-registering apertures of a gasket 40. The junctions between the thermocouple hot junctions are brought out to a point of common temperature 44, these forming the cold junctions of the system. Interposed in the circuit is suitable instrumentation 46, herein denominated as a mixture control. While a meter such as that shown at 36 of FIG. 4 may be used to advantage, it is recognized that the outputs of the various thermocouples may advantageously provide one input to an electronic fuel control system. Means for electronically metering fuel injection systems are known and may be adapted to respond to engine gas temperature signals in order to maintain the fuel-air ratio of the engine in a preferred range.

It will now be seen that the present invention provides an economical means for placing temperature sensors in the stream of gas passing through an internal combustion engine, at relatively uniform distances from the combustion chambers thereof. The inventor has found that such sensors are particularly well adapted for monitoring stratified charge or other lean-running engines. Importantly, the inventive apparatus can be installed in present-day engines without the need for special skills or tools, and without expensive machining operations.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. Apparatus for sensing the temperature of a stream of gas in an internal combustion engine having intake and exhaust ports, intake and exhaust manifolds and fastening means for coupling the manifolds to the ports, comprising:
   a gasket defining a plurality of port-registering apertures which correspond to at least some of the ports for sealingly engaging and being compressed between a manifold and a surface surrounding an engine port; and
   a plurality of thermocouples each comprising two wires of dissimilar metals joined at one end thereof to form a junction, said wires traversing portions of and affixed to said gasket so that each of said junctions extends within ones of said aperture.

2. Apparatus as defined in claim 1, wherein said gasket comprises an exhaust manifold gasket.

3. Apparatus as defined in claim 2, further including means for coupling each of said junctions to a cold junction remote from said gasket.

4. Apparatus as defined in claim 2 wherein said gasket defines at least one open ended slot for registering with said fastening means.

5. Apparatus as defined in claim 1, wherein said gasket comprises an intake manifold gasket.

6. Apparatus as defined in claim 1, further including means for coupling each of said junctions to a cold junction remote from said gasket.

7. Means for monitoring the fuel-air ratio of an internal combustion engine which includes intake and exhaust ports, intake and exhaust manifolds registering with respective ones of the ports, and means for fastening the manifolds in registry with the ports, comprising:
   a gasket for sealingly occupying the interstices between a manifold and the surface about the engine ports registering therewith, said gasket defining a plurality of apertures for registering with a corresponding plurality of aligned engine ports; and
   a plurality of thermocouples each comprising a pair of wires traversing said gasket and attached thereto, pairs of said wires being joined at the ends thereof to form junctions extending within ones of said apertures.

8. Apparatus as defined in claim 7, wherein said wires extend edgewise through the material of said gasket.

9. Apparatus as defined in claim 8, wherein said wires are disposed in depressions formed in the surface of the gasket.

10. Apparatus as defined in claim 7, wherein said gasket is an exhaust manifold gasket.

11. Apparatus as defined in claim 10, further including a selector switch having a plurality of terminals adapted to be coupled to ones of said plurality of said thermocouples.

12. Apparatus as defined in claim 10, wherein said thermocouples are coupled in series to form a thermopile.

13. Apparatus as defined in claim 7 wherein said gasket defines a plurality of open ended slots for registering with said fastening means, whereby said gasket may be assembled to an engine by lateral insertion into a gap between a surface about a port and a confronting manifold.

* * * * *